United States Patent
Grace et al.

(10) Patent No.: US 10,272,758 B2
(45) Date of Patent: Apr. 30, 2019

(54) BATTERY SYSTEM OF AN ELECTRIC VEHICLE

(71) Applicant: Proterra Inc., Greenville, SC (US)

(72) Inventors: Dustin Grace, San Carlos, CA (US); Brian Pevear, San Mateo, CA (US)

(73) Assignee: Proterra Inc., Burlingame, CA (US)

( * ) Notice: Subject to any disclaimer, the term of this patent is extended or adjusted under 35 U.S.C. 154(b) by 0 days.

(21) Appl. No.: 15/341,401

(22) Filed: Nov. 2, 2016

(65) Prior Publication Data

US 2018/0118011 A1 May 3, 2018

(51) Int. Cl.
*B60K 1/04* (2006.01)
*H01M 10/625* (2014.01)
(Continued)

(52) U.S. Cl.
CPC ............... *B60K 1/04* (2013.01); *B60K 1/02* (2013.01); *B60L 1/02* (2013.01); *B60L 3/0046* (2013.01); *B60L 3/04* (2013.01); *B60L 11/1853* (2013.01); *B60L 11/1862* (2013.01); *B60L 11/1864* (2013.01); *B60L 11/1866* (2013.01); *B60L 11/1875* (2013.01); *B60L 11/1877* (2013.01); *H01M 2/1077* (2013.01); *H01M 2/34* (2013.01); *H01M 10/0525* (2013.01); *H01M 10/441* (2013.01); *H01M 10/443* (2013.01); *H01M 10/48* (2013.01); *H01M 10/482* (2013.01); *H01M 10/486* (2013.01); *H01M 10/615* (2015.04); *H01M 10/625* (2015.04); *H01M 10/637* (2015.04); *H01M 10/657* (2015.04); *H01M 10/6568* (2015.04); *H01M 10/6571* (2015.04); *B60K 2001/005* (2013.01); *B60K 2001/008* (2013.01); *B60K 2001/0438* (2013.01); *B60L 2200/18* (2013.01); *B60L 2240/545* (2013.01); *B60L 2240/547* (2013.01); *B60L 2250/10* (2013.01); *B60L 2250/12* (2013.01); *B60Y 2200/143* (2013.01);
(Continued)

(58) Field of Classification Search
CPC ...... B60K 1/04; B60L 11/187; B60L 11/1875; H01M 10/443; H01M 10/637; H01M 10/6568; H01M 10/6571; H01M 10/6572
See application file for complete search history.

(56) References Cited

U.S. PATENT DOCUMENTS 2,938,066 A * 5/1960 Weigand ............. H01M 10/625
219/209
3,440,109 A * 4/1969 Plattner .................... H05B 3/78
219/205
(Continued)

FOREIGN PATENT DOCUMENTS

JP 2002352867 A 12/2002

OTHER PUBLICATIONS

Partial European Search Report in EP Application No. EP17197629, dated Mar. 19, 2018, 11 pages.

*Primary Examiner* — Frank B Vanaman
(74) *Attorney, Agent, or Firm* — Bookoff McAndrews, PLLC

(57) ABSTRACT

A method of operating an electric vehicle having a battery system with a first battery module and a second battery module includes sending a triggering signal. And, in response to the triggering signal, selectively dissipating energy from the first battery module without dissipating energy from the second battery module.

20 Claims, 3 Drawing Sheets

(51) Int. Cl.
*H01M 10/6568* (2014.01)
*H01M 10/6571* (2014.01)
*B60K 1/02* (2006.01)
*B60L 11/18* (2006.01)
*H01M 2/10* (2006.01)
*H01M 10/0525* (2010.01)
*H01M 10/44* (2006.01)
*H01M 10/48* (2006.01)
*B60L 1/02* (2006.01)
*B60L 3/00* (2019.01)
*B60L 3/04* (2006.01)
*H01M 2/34* (2006.01)
*H01M 10/615* (2014.01)
*H01M 10/637* (2014.01)
*H01M 10/657* (2014.01)
*B60K 1/00* (2006.01)
*H01M 10/42* (2006.01)

(52) U.S. Cl.
CPC ... *H01M 2010/4271* (2013.01); *H01M 2200/00* (2013.01); *H01M 2220/20* (2013.01); *Y02T 10/7005* (2013.01); *Y02T 10/7044* (2013.01); *Y02T 10/7061* (2013.01)

(56) References Cited

U.S. PATENT DOCUMENTS

| | | | |
|---|---|---|---|
| 4,320,334 A * | 3/1982 | Davis | G01R 31/3682 320/DIG. 21 |
| 4,651,253 A * | 3/1987 | Petri | H01H 79/00 361/124 |
| 5,490,572 A | 2/1996 | Tajiri et al. | |
| 5,625,272 A | 4/1997 | Takahashi | |
| 5,670,861 A * | 9/1997 | Nor | B60L 11/185 307/10.7 |
| 5,730,237 A | 3/1998 | Matsuki et al. | |
| 5,833,023 A * | 11/1998 | Shimizu | B62D 21/00 180/68.5 |
| 6,040,561 A | 3/2000 | Murty | |
| 2004/0004464 A1* | 1/2004 | Tsukamoto | H01M 10/44 320/162 |
| 2005/0017690 A1* | 1/2005 | Kamenoff | H01M 2/348 320/150 |
| 2006/0210868 A1* | 9/2006 | Kim | H01M 10/625 429/120 |
| 2008/0164849 A1* | 7/2008 | Ciaramitaro | H01M 10/345 320/151 |
| 2008/0275600 A1 | 11/2008 | Rask et al. | |
| 2009/0087723 A1* | 4/2009 | Inda | H01M 10/425 429/62 |
| 2010/0163322 A1* | 7/2010 | Stefani | B60L 11/005 180/65.21 |
| 2010/0305792 A1 | 12/2010 | Wilk | |
| 2012/0217933 A1* | 8/2012 | Abe | H01M 10/3909 320/128 |

* cited by examiner

BATTERY SYSTEM OF AN ELECTRIC VEHICLE

TECHNICAL FIELD

Embodiments of this disclosure relate to the battery system of an electric vehicle.

BACKGROUND

An electric vehicle uses an electric motor for propulsion. Energy required to power the propulsion motor is stored in a battery system located within the vehicle. Heavy-duty electric vehicles (such as, e.g., electric buses, electric trucks, etc.) may store a large amount of energy in its battery system. It some situations, it is desirable to selectively dissipate the energy stored in the battery system to the ambient to lower its stored energy. Embodiments of the current disclosure address these situations. The scope of the current disclosure, however, is defined by the attached claims, and not by the ability to solve any specific problem.

SUMMARY

Embodiments of the present disclosure relate to, for example, battery systems and methods of using the battery systems of electric vehicles. Each of the embodiments disclosed herein may include one or more of the features described in connection with any of the other disclosed embodiments.

In one embodiment, a method of operating an electric vehicle is disclosed. The electric vehicle may include a battery system. The battery system may include a plurality of battery modules, including a first battery module and a second battery module, electrically connected together. The method may include sending a triggering signal, and in response to the triggering signal, selectively dissipating energy from the first battery module without dissipating energy from the second battery module.

In another embodiment, a method of operating an electric vehicle is disclosed. The electric vehicle may include a battery system having a plurality of battery modules electrically connected together, and a battery management system configured to control the operation of the battery system. Each battery module may include a casing enclosing a plurality of battery cells therein, and one or more heaters positioned within the casing and powered solely by the plurality of battery cells enclosed in the casing. The method may comprise sending a triggering signal to the battery management system, and selectively activating the one or more heaters of a battery module of the plurality of battery modules in response to the triggering signal.

In yet another embodiment, an electric vehicle is disclosed. The electric vehicle may include one or more electric motors configured to propel the vehicle, and a battery system configured to provide power to the one or more electric motors. The battery system may include a plurality of battery modules electrically connected together. Each battery module may include a casing enclosing a plurality of battery cells therein, and one or more heaters positioned within the casing. The one or more heaters within each casing may be powered solely by the plurality of battery cells enclosed in the casing.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes the battery system of an electric vehicle. While principles of the current disclosure are described with reference to a battery system of an electric bus, it should be understood that the disclosure is not limited thereto. Rather, the battery systems of the present disclosure may be used in any application (electric vehicle, electric machine, electric tool, electric appliance, etc.). In this disclosure, relative terms, such as "about," "substantially," or "approximately" are used to indicate a possible variation of ±10% of a stated value. Any implementation described herein as exemplary is not to be construed as preferred or advantageous over other implementations. Rather, the term "exemplary" is used in the sense of example or illustrative.

Figure 1A:
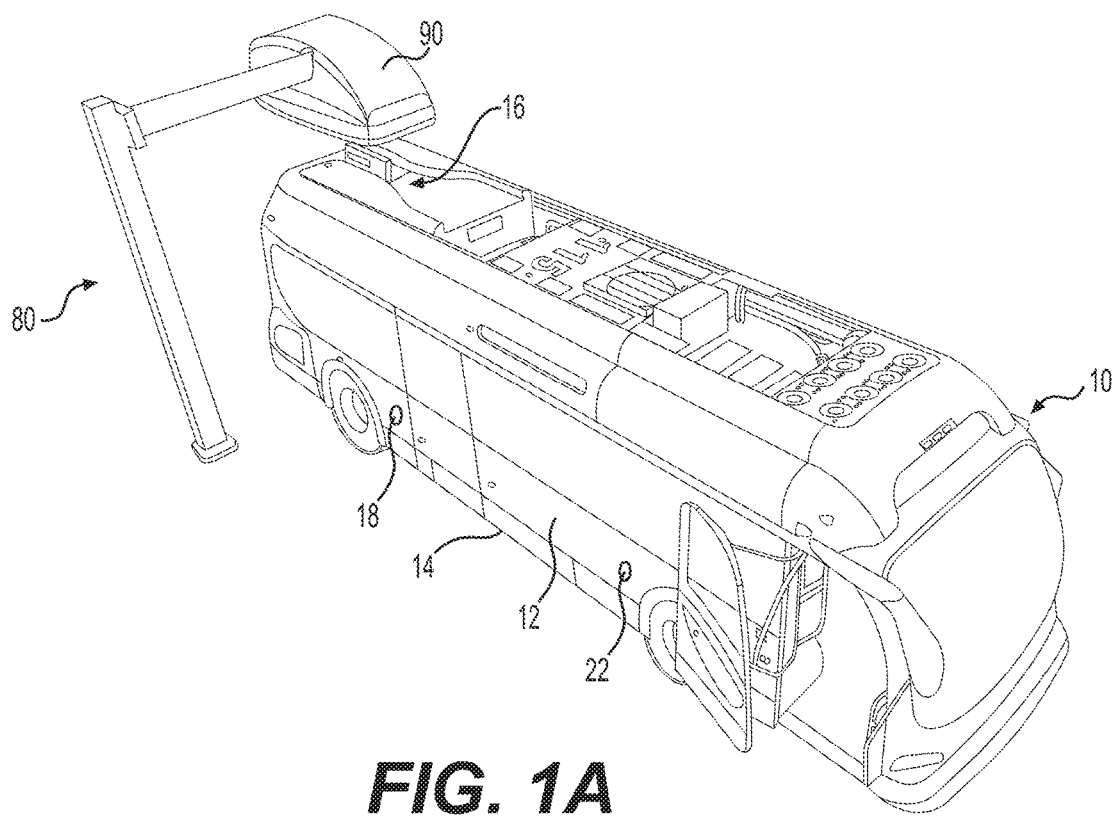
FIGS. 1A and 1B illustrate different views of an exemplary electric bus having a battery system.
Figure 1B:
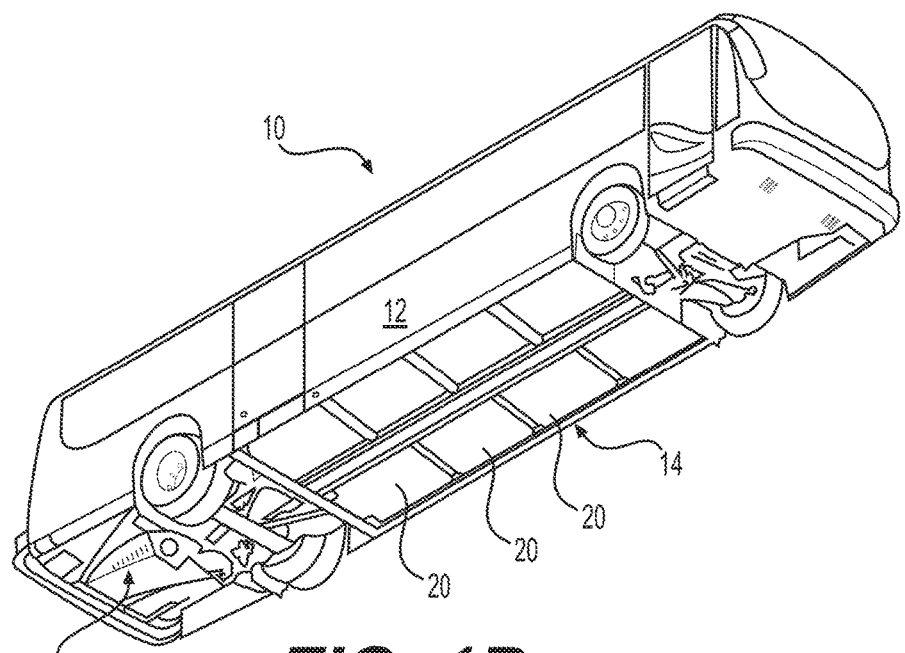

FIGS. 1A and 1B illustrate an electric bus 10. FIG. 1A shows the top view of the bus 10 and FIG. 1B shows its bottom view. In the discussion that follows, reference will be made to both FIGS. 1A and 1B. Electric bus 10 may include a body 12 enclosing a space for passengers. In some embodiments, some (or all) parts of body 12 may be fabricated using one or more composite materials to reduce the weight of the bus 10. In some embodiments, bus 10 may be a low-floor electric bus. As is known in the art, in a low-floor bus, there are no stairs at the front and/or the back doors of the bus. In such a bus, the floor is positioned close to the road surface to ease entry and exit into the bus. In some embodiments, the floor height of the low-floor bus may be about 12-16 inches (30-40 centimeters) from the road surface. Body 12 of bus 10 may have any size, shape, and configuration.

Bus 10 may include one or more electric motors 15 that generate power for propulsion, and a battery system 14 to store the energy needed to power the electric motor(s) 15. When the energy stored in the battery system 14 decreases, it may be recharged by electrically connecting the battery system 14 to an external energy source. In some embodiments, the bus 10 may enable recharging of the battery system 14 by several methods. In some embodiments, a charging interface 16 may be located on the roof of bus 10. The charging interface 16 may include a charging blade with electrodes and an alignment scoop in the form of a pair of curved rails (that together form a funnel-shaped alignment feature) positioned on either side of the charging blade. The charging interface 16 may engage with the charging head 90 of a road-side charging station 80 to recharge the battery system 14. Details of an exemplary charging interface 16, and an exemplary method of using the charging interface 16, are described in commonly assigned U.S. Patent Application Publication Nos. US 2013/0193918 A1 and US 2014/0070767 A1, which are incorporated by reference in their entirety herein.

Additionally or alternatively, in some embodiments, the battery system 14 may be charged by connecting an external power supply to a charge port 18 located on a side surface of the bus 10. To charge battery system 14 through the charge port 18, a connector carrying power from an external power supply may be plugged into the charge port 18. In some embodiments, the charge port 18 may be a standardized charge port (e.g., SAE J1772 charge port) that is configured to receive a corresponding standardized connector (e.g., SAE J1772 connector). Details of an exemplary charge port 18, and an exemplary method of using the charge port 18, are described in commonly assigned U.S. patent application Ser. No. 15/227,163, filed Aug. 3, 2016, which is incorporated by reference in their entirety herein.

In some embodiments, the bus 10 may be charged using the roof-top charging interface 16 when travelling on a route, and charged using the charge port 18 when it is parked in a bus depot (e.g., at night, between trips, etc.). In some embodiments, bus 10 may also include a wireless charge receiver 22 configured to use wireless technology (such as, e.g., inductive charging) to recharge the battery system 14. The charge receiver 22 may inductively couple with a corresponding charge transmitter (e.g., positioned on a wall of a charging station or a road surface) to recharge the battery system 14 using external power. It should be noted that, although the charging interface 16, charge port 18, and charge receiver 22 are illustrated as being positioned at specific locations on the bus 10, this is only exemplary. In general, these components may be positioned anywhere on the bus 10.

Battery system 14 may include any type of vehicle battery known in the art. In some embodiments, the battery system 14 may have a modular structure and may be configured as a plurality of battery packs 20. Although FIG. 1B illustrates the battery packs 20 as being positioned under the floor of the bus 10, this is only exemplary. In some embodiments, some or all of the battery packs 20 may be positioned elsewhere (roof, inside, etc.) on the bus 10. However, since the battery system 14 may have considerable weight, positioning the battery packs 20 under the floor may assist in lowering the center of gravity of the bus 10 and balance its weight distribution, thus increasing drivability and safety.

Figure 2:
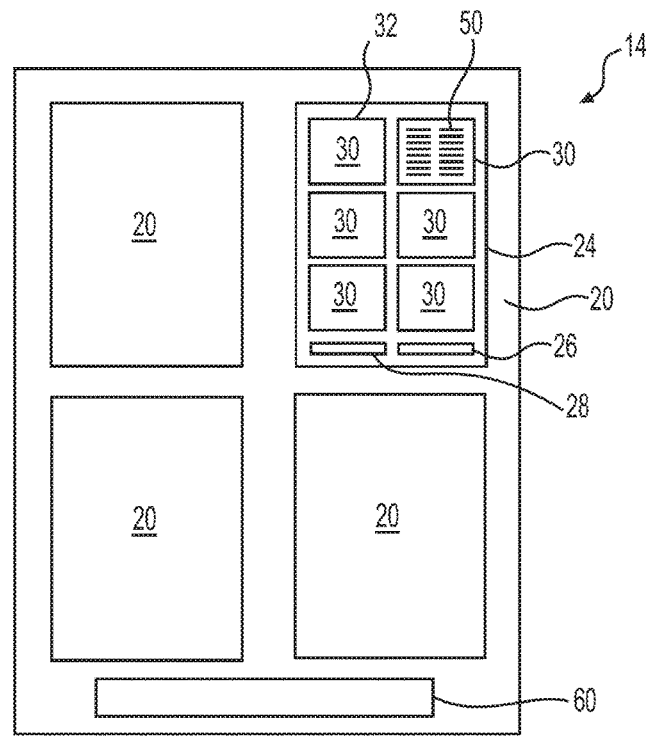
FIG. 2 is a schematic illustration of an exemplary battery system of the bus of FIG. 1A.

FIG. 2 is a schematic illustration of an exemplary battery system 14 of bus 10. Battery system 14 may include a plurality of battery packs 20. Each battery pack 20 may include a plurality of battery modules 30, and each battery module 30 may include a plurality of battery cells 50 arranged therein. In FIG. 2, the inside structure of one of the battery packs 20, and the inside structure of one of the battery modules 30 of the battery pack 20, are shown to aid in the discussion below. The battery cells 50 may have any chemistry and construction. In some embodiments, the battery cells 50 may have a lithium-ion chemistry. Lithium-ion chemistry comprises a family of battery chemistries that employ various combinations of anode and cathode materials. In automotive applications, these chemistries may include lithium-nickel-cobalt-aluminum (NCA), lithium-nickel-manganese-cobalt (NMC), lithium-manganese-spinel (LMO), lithium titanate (LTO), and lithium-iron phosphate (LFP). In consumer applications, the battery chemistry may also include lithium-cobalt oxide (LCO). Exemplary battery chemistries are described in commonly assigned U.S. Pat. No. 8,453,773, which is incorporated herein by reference in its entirety.

The plurality of battery packs 20 of the battery system 14 may be connected together in series or in parallel. In some embodiments, these battery packs 20 may also be arranged in strings. For example, battery system 14 may include multiple strings connected in parallel, with each string including multiple battery packs 20 connected together in series. Configuring the battery system 14 as parallel-connected strings allows the bus 10 to continue operating with one or more strings disconnected if a battery pack 20 in a string fails or experiences a problem. The plurality of battery modules 30 in each battery pack 20, and the plurality of battery cells 50 in each battery module 30, may also be electrically connected together in series or parallel. In some embodiments, some of the battery modules 30 in a battery pack 20 may be connected together in series, and the series-connected modules connected together in parallel. Similarly, in some embodiments, a group of battery cells 50 in each module 30 may be connected together in series to form multiple series-connected groups of cells 50, and these series-connected groups may be connected together in parallel. That is, some or all battery packs 20 in the battery system 14 may include both series-connected and parallel-connected battery modules 30, and some or all battery modules 30 in each battery pack 20 may include both series-connected and parallel-connected battery cells 50. Although not a requirement, in some embodiments, each battery pack 20 of battery system 14 may be substantially identical (in terms of number of modules 30, number of cells 50 in each module 30, how the modules are connected, etc.) to each other.

In general, the battery packs 20 of the battery system 14 may be physically arranged in any manner. In some embodiments, the battery packs 20 may be arranged in a single layer on a common horizontal plane to decrease the height of the battery system 14, so that it may be positioned under the floor of the low-floor bus 10. For example, the battery packs 20 may have a height less than or equal to about 7 inches (18 centimeters), to allow the battery system 14 to be accommodated under the floor of the low-floor bus 10. The low height profile of the battery system 14 may allow the battery system 14 to be more aerodynamic, and may increase its surface area relative to the number of battery cells to increase heat dissipation and improve temperature regulation. In general, the battery system 14 may be configured to store any amount of energy. Increasing the amount of energy stored in the battery system 14 may increase the distance that the bus 10 can travel between recharges. In some embodiments, the number of battery packs 20, battery modules 30, and battery cells 50, and the chemistry of the battery cells, etc. may such that the total energy capacity of the battery system 14 may be between about 200-700 KWh.

In general, battery system 14 may have any number (e.g., 2, 3, 4, 6, 8, 10, etc.) of battery packs 20. In some embodiments, the number of battery packs 20 in the battery system 14 may be between about 2-6. Each battery pack 20 may have a protective housing 24 that encloses the plurality of battery modules 30 (and other components of the battery pack 20) therein. Although the battery pack 20 of FIG. 2 is illustrated as including six battery modules 30 arranged in two columns, this is only exemplary. In general, any number (4, 6, 8, 10, 12, 14, 16, 18, 20, 22, 24, etc.) of battery modules 30 may be provided in a battery pack 20, and each battery module 30 may include any number of battery cells 50 (100, 200, 300, 400, 500, 600, 800, etc.) arranged in any manner. In some embodiments, the number of battery modules 30 in each battery pack 20 may be between about 10-20, and the number of battery cells 50 housed each battery module 30 may be between about 400-700. In some embodiments, the battery modules 30 housed in the housing 24 of a battery pack 20 may be separated from each other with dividers (not shown) that provide electrical and thermal insulation. The dividers may protect the other battery modules 30 if any battery module 30 fails (e.g., experiences a high temperature event). The dividers may be made of a material that does not oxidize or otherwise become damaged when exposed to electrical arcs and/or high temperatures.

The housing 24 of each battery pack 20 may have a box-like structure, and may be shaped to allow the battery modules 30 of the battery pack 20 to be arranged in a single layer on a common horizontal plane to decrease the height of the battery pack 20. In some embodiments, the housing 24 may be watertight (e.g., to approximately 1 meter) and have an International Protection (IP) 67 rating for dust and water resistance. The housing 24 may be configured to contain any failures (electric arcs, fires, etc.) within the battery pack 20 in order to prevent damage to other battery packs or other portions of the bus 10 if a component inside a battery pack fails. In some embodiments, the housing 24 may be constructed of corrosion and puncture resistant materials. Housing 24 may include materials, such as, for example, composite materials, Kevlar, stainless steel, aluminum, high strength plastics, etc.

In addition to battery modules 30, housing 24 may also enclose a pack controller 26 that monitors the operation of the battery modules 30 and a thermal management system 28 that assists in managing the temperature of the battery modules 30 of the battery pack 20 (i.e., heat, cool, etc.). The pack controller 26 may monitor the state (humidity, state of charge, current, temperature, etc.) of the battery modules 30 and the battery cells 50 in the battery pack 20, and control (alone or in cooperation with the other controllers of battery system 14) the operations of the battery pack 20 to ensure that power is safely and efficiently directed into and out of the battery pack 20. The thermal management system 28 may include components that circulate air and/or a liquid coolant to the modules 30 to heat or cool the modules 30. These components may include known components (such as, for e.g., circulating fans, coolant conduits, heat exchangers, etc.) that assist in circulating air and/or a coolant through the modules 30 packaged in the housing 24 to manage the temperature of the battery pack 20.

Battery system 14 may include a battery management system (BMS 60) that cooperates with the pack controller 26 (and other controllers) to control the operation of the battery system 14. The BMS 60 may include circuit boards, electronic components, sensors, and controllers that monitor the performance of the components (e.g., packs 20, modules 30, and cells 50) of the battery system 14 based on sensor input (e.g., voltage, current, temperature, humidity, etc.), provide feedback (alarms, alerts, etc.), and control the operation of the battery system 14 for safe and efficient operation of the bus 10. In some embodiments, the BMS 60 may perform charge balancing between different cells 50 of a pack 20 during recharging. BMS 60 may also thermally and/or electrically isolate sections (cells, modules, packs, etc.) of the battery system 14 when one or more sensor readings (temperature, etc.) exceed a threshold value. As will be described in more detail later, in some embodiments, BMS 60 may initiate or control energy discharge from all or selected cells 50 of one or more modules 30 in response to predefined trigger events. An exemplary BMS 60 that may be used in battery system 14 are described in commonly-assigned U.S. Patent Application Publication No. US 2012/0105001 A1, which is incorporated by reference in its entirety herein.

Figure 3:
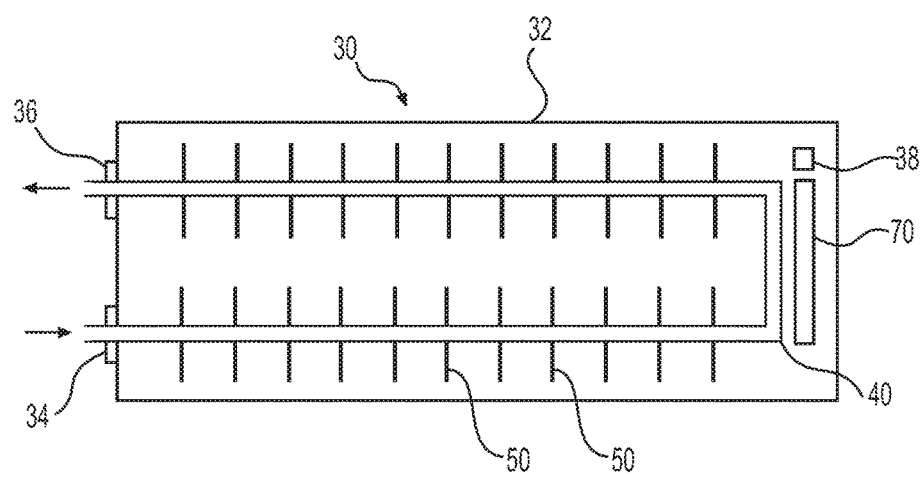
FIG. 3 is a schematic illustration of an exemplary battery module of the battery system of FIG. 2.

FIG. 3 is a schematic illustration of an exemplary battery module 30 of a battery pack 20. The battery module 30 includes a casing 32 that encloses the plurality of battery cells 50 of the module 30 therein. Similar to housing 24 of battery pack 20, casing 32 may be configured to contain any failures (electric arcs, fires, etc.) of the cells 50 of the module 30 within the casing 32 in order to prevent the damage from spreading to other modules 30 of the battery pack 20. Casing 32 may be made of any material suitable for this purpose. In some embodiments, the casing 32 may be constructed of one or more of materials such as, for example, Kevlar, aluminum, stainless steel, composites, etc. In some embodiments, the casing 32 may be substantially air-tight to hermetically seal the cells 50 of the module 30 therein.

In general, the cells 50 may have any shape and structure (cylindrical cell, prismatic cell, pouch cell, etc.). Typically, all the cells 50 of a module 30 may have the same shape. However, it is also contemplated that different shaped cells may be packed together in the casing 32 of a module 30. In addition to the cells 50, the casing 32 may also include sensors (e.g., temperature sensor, voltage sensor, humidity sensor, etc.) and controllers (e.g., a module controller 38) that monitor and control the operation of the cells 50. Although not illustrated, casing 32 also includes electrical circuits (voltage and current sense lines, low voltage lines, high voltage lines, etc.), and related accessories (fuses, switches, etc.), that direct electrical current to and from the cells 50 during recharging and discharging.

As explained previously, the cells 50 of module 30 may be electrically connected together in any manner (parallel, series, or groups of series-connected cells connected together in parallel). These cells 50 may also be physically arranged in any manner. In some embodiments, cells 50 of a module 30 may be packed together tightly to fill the available volume within the casing 32. In some embodiments, the cells 50 may be arranged together to form multiple groups (e.g., bricks) of cells electrically connected together in series. The multiple bricks (each comprising multiple cells 50 electrically connected together) may then be electrically connected together (e.g., in series or parallel) and packaged together in the casing 32. In some embodiments, one or more sensors may be associated with each brick of the module 30. Terminals (e.g., positive and negative terminals) electrically connected to the cells 50 of the module 30 may be provided on an external surface of the casing 32.

The casing 32 may also include a coolant loop 40 configured to circulate a coolant through the module 30. The coolant loop 40 may comprise fluid conduits arranged to pass through, or meander (e.g., zigzag) through, the volume enclosed by the casing 32. An inlet port 34 and an outlet port 36 of the casing 32 fluidly couples the cooling loop 40 to a coolant circuit of the battery system 14. The coolant enters the cooling loop 40 through the inlet port 34 and exits the casing 32 through the outlet port 36. In embodiments, where the module 30 is air cooled, the casing 32 may also include inlet and outlet vents configured to direct cooling air into and out of the casing 32. In some embodiments, the coolant may cool all the modules 30 of a battery pack 20 before exiting the battery pack 20. That is, the cooling loops 40 of the modules 30 of pack 20 may be connected in series such that the coolant exiting one module 30 enters the cooling loop 40 of another module 30. In some embodiments, coolant may be directed into each module 30 individually (for e.g., from a common coolant gallery of the pack 20). It is also contemplated that, in some embodiments, groups of modules 30 within a pack 20 may be fluidly connected in series and multiple series-connected modules 30 may be connected together in parallel.

During operation of the battery system 14, the cells 50 of the module 30 release heat. This released heat may be transferred to the coolant circulating through the coolant loop 40 and then removed from the casing 32 along with the coolant. In general, any known fluid may be used as the coolant. In some embodiments, water (with suitable additives such as antifreeze, etc.) or another suitable liquid may be used as the coolant. The cells 50 of the module 30 may be arranged to enhance heat dissipation into the coolant circulating through the module 30. For example, in some embodiments, the cells 50 may be in close thermal contact with the coolant loop 40. In some embodiments, the cells 50 may be placed in close thermal contact with metal plates that serve as heat conducting pathways to the cooling loop.

Module 30 may also include one or more heaters 70 positioned within the casing 32 (or in close thermal contact with the casing 32). In general, any type of heating device (resistance heater, positive temperature coefficient (PTC) heater, etc.) may be used as heater 70. In some embodiments, the heater 70 may be a PTC cartridge heater. Unlike a resistance heater which generates heat at a constant rate, a PTC heater uses PTC resistive elements which generate heat at a lower rate at higher temperatures. Therefore, a PTC heater is self-regulating to a fixed working temperature In some embodiments, the heater 70 (or the multiple heaters) of each module 30 is powered solely by the cells 50 of that module 30. The heater 70 may be activated by the module controller 38 and/or by another controller (e.g., pack controller 26, BMS 60, etc.) of the battery system 14. When the heater 70 is activated, it generates heat using the energy stored in the cells 50 of that module 30. Consequently, the stored energy (or state of charge (SOC)) of the cells 50 in the module 30 decrease as a result of activation of the heater 70. The heat dissipated by the heater 70 may be removed from the module 30 by the circulating coolant (or by conduction). A temperature sensor (or thermistor) of the module 30 may monitor the heat dissipated by the heater 70.

The heater 70 may be positioned at any location within the casing 32. In general, the location of the heater 70 may be selected such that the maximum energy discharged by the heater 70 does not damage (or jeopardize the safety of) the battery cells 50 of the module 30. Therefore, in some embodiments, the heater 70 may be spaced away from (i.e., not directly in contact with) the cells 50 such that the heater 70 is thermally isolated from the cells 50. The location of the heater 70 may be also selected such that the dissipated heat can be easily transferred to the body of the battery pack 20 (thus allowing the heater to dissipate more heat without a resulting increase in temperature). Therefore, in some embodiments, the heater 70 may be positioned in direct contact with the metal frame of the battery pack 20 to enhance heat conduction. In some embodiments, the heater 70 may be positioned close to (as illustrated in FIG. 3) the cooling loop 40 of the module 30 so that the dissipated heat may be easily transferred to the coolant circulating through the cooling loop 40. It is also contemplated that, in some embodiments, the heater 70 may be positioned within the cooling loop 40 (i.e., submerged in the coolant of the cooling loop 40). In some embodiments, as illustrated in FIG. 3, the heater 70 may be positioned about midway of the cooling loop 40 in a module 30. That is, the heater 70 may be positioned proximate to (on within) the cooling loop 40, and substantially equidistant from the inlet port 34 and the outlet port 36.

Although a single heater 70 is illustrated in FIG. 3, in some embodiments, multiple heaters (similar to heater 70) may be positioned within the casing 32 of each module 30. Each of these multiple heaters 70 will be powered the cells 50 of that module 30 so that activating these multiple heaters 70 will discharge energy from all the cells 50 at a faster rate as compared to a case when a single heater is used. In some embodiments, a first group of cells 50 of the module 30 (e.g., a brick) may power a first heater 70, and a second group of cells 50 of the module 30 may power a second heater 70. In such an embodiment, activating the first heater will selectively discharge energy from the first group of cells, and activating the second heater will selectively discharge energy from the second group of cells. The multiple heaters 70 may be positioned adjacent to each other or spaced apart from each other in the casing 32. In some embodiments, the multiple heaters 70 may be positioned such that desired regions of the module 30 can be selectively discharged by activating different heaters.

As explained previously, the heater 70 may be activated by BMS 60 alone or in cooperation with the module controller 38 and/or the pack controller 26. In some embodiments, BMS 60 may simultaneously activate the heaters 70 embedded in (inserted in, positioned in, included in, etc.) each battery module 30 of the battery system 14 to discharge energy from the cells 50 of every module 30, and thereby, reduce the SOC of the entire battery system 14. In some embodiments, BMS 60 may selectively activate the heaters 70 embedded in selected battery modules 30 to preferentially discharge energy from (and thereby reduce the SOC of) the selected modules 30. For example, if sensors detect that one module 30 of a battery pack 20 includes a damaged cell 50, the BMS 60 may selectively activate the heaters 70 embedded in all the other battery modules 30 of the battery pack (i.e., except the module 30 with the damaged battery cell 50) to safely decrease the SOC of the battery pack 20. In embodiments where multiple heaters 70 are embedded in a module 30, the BMS 60 may also be configured to selectively activate some heaters 70 of the module 30 to preferentially discharge energy from selected cells 50 (e.g., bricks) of the module 30.

BMS 60 may activate the heaters 70 embedded in the modules 30 to discharge energy from (and thus decrease the SOC of) the battery system 14 of a stranded (or otherwise incapacitated) bus 10 before service personnel operates on (repairs, removes the batteries from, etc.) the bus 10. The battery system 14 of the bus 10 stores a relatively large amount of energy (e.g., between about 200-700 KWh). Operating on a bus 10 with such a large amount of stored energy may be undesirable. Dissipating the stored energy from the battery system 14 by activating the heaters 70 lowers the SOC of the battery system 14. After the SOC of the battery system 14 has been lowered to a suitable level, the heaters 70 may be deactivated. Although the discussion above describes embedding a heater 70 in a module 30 of a battery pack 20, this is only exemplary. In general, any electric load may be embedded in a module 30 to selectively dissipate energy from the cells of the module 30

In general, the heat produced by the heaters 70 may be dissipated from the battery system 14 by conduction, convection, or radiation. In general, the heaters 70 are positioned in the modules 30 such that the heat produced by them can be removed without overheating the cells 50 of the module 30. In some embodiments, the heat produced by the heaters 70 of a module 30 may be used to increase the temperature of the battery cells 50 of the module 30. For example, cold battery cells 50 may be heated using the hot coolant during winter. In some such embodiments, the coolant in the cooling loop 40 (of a module 30) may be heated by the heat dissipated by the heater 70 of the module 30, and the warm coolant may then be used to heat the cells 50 on its way out of the module 30.

In some embodiments, the inlet port 34 and/or the outlet port 36 of the cooling loop 40 may be selectively opened and closed (e.g., using adjustable valves) by the BMS 60, based on sensor readings (humidity, temperature, etc.) from within the module 30. The BMS 60 may use these adjustable valves to redirect the coolant flow within the battery system 14 based on the local conditions within the modules 30. In some such embodiments, one or both of these ports 34, 36 may be closed by the BMS 60 when the temperature within the module 30 is at or below a threshold value and opened when the temperature is above the threshold value. When the ports 34, 36 of a module 30 are closed, the warmed coolant in the cooling loop 40 may heat the cells 50 of the module 30 to a higher temperature relatively quickly. Operating the battery system 14 using warm battery cells 50 allows it to charge and discharge at higher power levels, thus improving performance.

The implementation of a heater 70 in every module 30 of the battery system 14 (as opposed to providing a coolant heater external to the battery system 14) enables the battery cells 50 of the battery system 14 to be heated more quickly and efficiently. Further, locating the heater 70 to be substantially in the middle of the coolant loop 40 enables the heat dissipated by the heater 70 to be distributed throughout the coolant loop which will result in improved heating performance in a short amount of time.

The BMS 60 (and/or other controllers of battery system 14) may selectively activate the heaters 70 of a module 30 in response to any triggering event. In some embodiments, the triggering event may include input from a human operator or one or more sensors of the bus 10. For example, non-limiting examples of a triggering event may include: a signal from a source outside the bus 10 (e.g., a wireless signal from service personnel, rescue personnel, central location, etc. responding to an incapacitated bus); input from one or more sensors that indicate an incapacitated bus (e.g., a button activated by the driver, airbag sensor, collision sensor, etc.); input from one or more sensors that indicate conditions of the battery system 14 (e.g., sensors that indicate that the SOC of the battery system 14 is above a threshold SOC value, sensors that indicate that the temperature of the cells of a module 30 is above/below a threshold temperature value, sensors that indicate that one or cells 50 in a module 30 are damaged, etc.); and a signal from the driver. In some embodiments, the driver of the bus 10 may trigger the BMS 60 to activate the heaters 70 (some or all) by pressing a button on the bus 10. In some embodiments, personnel responding to an incapacitated bus may wirelessly trigger the BMS 60 using a signaling device (smart phone, etc.) to activate the heater 70.

In response to the triggering signal, the BMS 60 may selectively activate one or more of the heaters 70 embedded in selected modules 30 (i.e., all or some of the modules 30). For example, if sensor readings indicate that one or more battery cells 50 of a module 30 may be defective, upon receiving a signal from personnel to decrease the SOC of the battery system 14, the BMS 60 may selectively activate the heaters 70 embedded in all the modules 30, except the module 30 with the defective battery cells 50, to safely decrease the SOC of the battery system 14. The heaters 70 may be deactivated when the SOC of the battery system 14 is less than or equal to the threshold SOC value (or when the battery temperature is greater than or equal to a threshold temperature value). In general, the rate of energy discharge by the heaters 70 may be based on the capacity of the heaters 70. In some embodiments, the BMS 60 (or personnel) may select the rate of energy discharge (for e.g., by selecting the number of heaters 70 to activate in a module 30, selecting the voltage or current directed to the heater 70, etc.). In some embodiments, the BMS 60 may also selectively activate the heaters 70 embedded in a desired region of a module 30 (e.g., a heater electrically connected to a brick of cells 50 in a module 30) as opposed to other regions, to selectively discharge energy from these desired regions of the module 30.

Exemplary applications of the heaters 70 of the battery system 14 will now be described. In some cases, service personnel responding to a disabled bus 10 (incapacitated, damaged, stranded, etc.) may decide to remove the battery packs 20 from the bus 10, before working on the bus 10. If the SOC of the battery system 14 is too high (e.g., above a threshold value), the service personnel may decide to reduce the SOC of the battery packs 20 before removing the battery packs 20 from the disabled bus 10. FIG. 4A is a flow chart that illustrates an exemplary method 100 used by the service personnel to reduce the SOC of the battery system 14. The service personnel may send a triggering signal to the BMS 60 to reduce the SOC of the battery packs 20 (step 110). In general, the triggering signal may be send to the BMS 60 by any method. In some embodiments, the service personnel may use a diagnostic computer connected to the electrical network of the bus 10 to access and send the triggering signal to the BMS 60.

Upon receipt of the triggering signal, the BMS 60 activates the heaters 70 of selected battery modules 30 to reduce the SOC of the battery system 14 (step 120). That is, the BMS 60 selectively activates discharge of energy of the modules 30 of the battery system 14. For example, if the BMS 60 knows (e.g., based on readings from humidity sensors embedded in a battery module 30) that a battery cell 50 of a battery module 30 is defective (e.g., degassing), upon receipt of the triggering signal (i.e., step 110), in step 120, the BMS may selectively activate the heaters 60 embedded in all the battery modules 30 except the battery module 30 with the defective cell. Since a heater 70 embedded in a module 30 is powered solely by the battery cells 50 of that module 30, activation of the heater 70 will reduce the energy stored in that module 30. The BMS 60 then checks to determine if the SOC of the battery system 14 is less than or equal to a threshold SOC value (step 130). The threshold SOC value may be a value of SOC that is low enough for human operators to operate on the battery system 14. If the SOC≤the threshold SOC value, (i.e., step 130=Y), the BMS 60 deactivates the heaters 70 (step 140). If it is not (i.e., step 130=N) the heaters 70 are kept active until the state of charge decreases below the threshold SOC value. In some embodiments, the energy discharge from the modules 30 may be continued until the modules 30 are substantially completely drained.

Figure 4B:
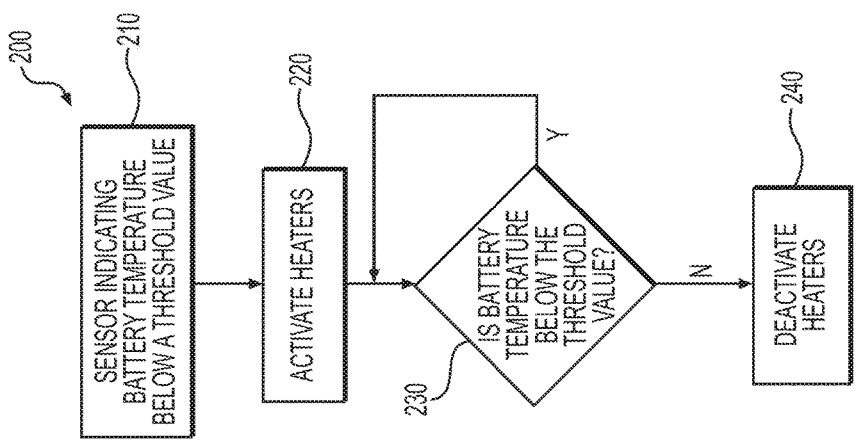
FIG. 4B is a flow chart of another exemplary method of using the battery system of FIG. 2.
Figure 4A:
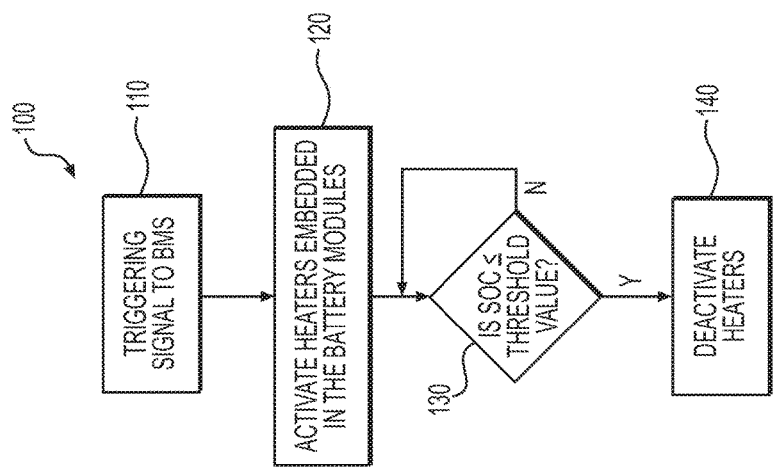
FIG. 4A is a flow chart of an exemplary method of using the battery system of FIG. 2.

FIG. 4B illustrates an exemplary method 200 of operating the heaters 70 to increase the temperature of the battery system 14. When sensor inputs indicate that the temperature of the battery system 14 is below a threshold temperature value (step 210), the BMS 60 selectively activates the heaters 70 (step 220). As explained with reference to FIG. 4A, selective activation includes activating only the heaters 70 embedded in desired (some or all) battery modules 30 without activating the heaters 70 embedded in other battery modules 30. The heat dissipated from a heater 70 embedded in a battery module 30 increases the temperature of the battery cells 50 of that battery module 30. The heaters 70 may remain active as long as the battery temperature is below the threshold temperature value (step 230=Y). When the temperature is greater than or equal to the temperature threshold (step 230=N), the heaters 70 may be deactivated (step 240).

While principles of the present disclosure are described herein with reference to the battery system of an electric bus, it should be understood that the disclosure is not limited thereto. Rather, the systems described herein may be employed in the batteries of any application. Also, those having ordinary skill in the art and access to the teachings provided herein will recognize additional modifications, applications, embodiments, and substitution of equivalents all fall within the scope of the embodiments described herein. Accordingly, the disclosure is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A method of operating an electric vehicle including a battery system having a plurality of battery modules electrically connected together, the plurality of battery modules including (a) a first battery module with a first heater positioned within the first battery module and powered solely by the first battery module, and (b) a second battery module with a second heater positioned within the second battery module and powered solely by the second battery module, comprising:
   sending a triggering signal, wherein the triggering signal is indicative of a defect associated with the second battery module; and
   in response to the triggering signal, selectively dissipating energy from the first battery module by activating the first heater without dissipating energy from the second battery module, wherein the first and second battery modules are connected together in parallel and both the first battery module and the second battery module include energy when energy is selectively dissipated from the first battery module.

2. The method of claim 1, wherein sending a triggering signal includes sending a signal from a source external to the vehicle.

3. The method of claim 2, wherein sending a signal from a source external to the vehicle includes sending a wireless signal.

4. The method of claim 1, wherein sending a triggering signal includes sending a signal indicative of a disablement of the vehicle.

5. The method of claim 1, wherein sending a triggering signal includes sending a signal indicative of a temperature within the second battery module being below a threshold value.

6. The method of claim 1, further including receiving input from one or more sensors indicating a defect associated with the second battery module.

7. The method of claim 1, further including deactivating energy dissipation from the first battery module when a state of charge of the first battery module is below a threshold value.

8. The method of claim 1, wherein each battery module of the plurality of battery modules further includes (a) a plurality of battery cells, and (b) a liquid cooling loop positioned within the battery module, and wherein selectively dissipating energy from the first battery module further includes transferring heat produced by the first heater to the liquid cooling loop of the first battery module.

9. The method of claim 1, wherein selectively dissipating energy from the first battery module includes dissipating the energy through an electrical load.

10. A method of operating an electric vehicle including a battery system having a plurality of battery modules electrically connected together and a battery management system configured to control the operation of the battery system, wherein each battery module of the plurality of battery modules includes (a) a casing enclosing a plurality of battery cells therein, and (b) one or more heaters positioned within the casing and powered solely by the plurality of battery cells enclosed in the casing, the method comprising:
    sending a triggering signal to the battery management system, wherein the triggering signal is indicative of a fault associated with a first battery module of the plurality of battery modules; and
    selectively activating the one or more heaters of each battery module of the plurality of battery modules, except the first battery module, in response to the triggering signal.

11. The method of claim 10, wherein sending a triggering signal includes sending a triggering signal from a source external to the vehicle.

12. The method of claim 10, wherein each battery module of the plurality of battery modules further includes a cooling loop positioned within the casing, and wherein sending a triggering signal includes sending a triggering signal when a temperature within a first battery module of the plurality of battery modules is below a threshold temperature.

13. The method of claim 10, wherein the selectively activating includes activating the one or more heaters of a battery module to heat the plurality of battery cells of the battery module using heat dissipated by the one or more heaters.

14. The method of claim 10, wherein selectively activating the one or more heaters of a battery module includes dissipating energy stored in the plurality of battery cells of the battery module using the one or more heaters.

15. A method of operating an electric vehicle including a battery system, the battery system including a plurality of battery cells, a first heater, and a second heater, comprising:
    in response to a first triggering signal, selectively activating the first heater to dissipate energy from a first group of battery cells of the plurality of battery cells without dissipating energy from a second group of battery cells of the plurality of battery cells, wherein the first triggering signal is indicative of a fault associated with at least one battery cell of the second group of battery cells; and
    in response to a second triggering signal, selectively activating the second heater to dissipate energy from the second group of battery cells without dissipating energy from the first group of battery cells, wherein the second triggering signal is indicative of a fault associated with at least one battery cell of the first group of battery cells.

16. The method of claim 15, further including sending the first triggering signal from a source external to the vehicle.

17. The method of claim 15, further including deactivating energy dissipation from the first group of battery cells when a state of charge of the first group of battery cells is below a first threshold value.

18. The method of claim 17, further including deactivating energy dissipation from the second group of battery cells when a state of charge of the second group of battery cells is below a second threshold value.

19. The method of claim 15, further including receiving the first triggering signal and the second triggering signal from a source external to the electric vehicle.

20. The method of claim 15, further including receiving input from one or more sensors indicating a fault associated with at least one battery cell of the plurality of battery cells.

* * * * *